US007957740B2

(12) United States Patent
Yoon

(10) Patent No.: US 7,957,740 B2
(45) Date of Patent: Jun. 7, 2011

(54) APPARATUS AND METHOD FOR PERFORMING HANDOFF TO REDUCE NUMBER OF SESSION TRANSFERS IN A MOBILE COMMUNICATION SYSTEM

(75) Inventor: Seung-Il Yoon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 968 days.

(21) Appl. No.: 11/822,205

(22) Filed: Jul. 3, 2007

(65) Prior Publication Data

US 2008/0009290 A1 Jan. 10, 2008

(30) Foreign Application Priority Data

Jul. 4, 2006 (KR) ........................ 10-2006-0062646

(51) Int. Cl.
*H04W 36/00* (2009.01)
*H04W 4/00* (2009.01)

(52) U.S. Cl. ........ 455/436; 455/437; 455/438; 455/439; 455/440; 370/331

(58) Field of Classification Search .......... 455/436–444; 370/331
See application file for complete search history.

(56) References Cited

U.S. PATENT DOCUMENTS 4,904,582 A 2/1990 Tullis
5,703,218 A 12/1997 Urdea et al.
7,546,124 B1 * 6/2009 Tenneti et al. ................ 455/436
2004/0249178 A1 12/2004 Vargeese et al.
2005/0266847 A1 12/2005 Tinnakornisrisuphap et al.
2006/0072506 A1 4/2006 Sayeedi et al.
2006/0159407 A1 7/2006 Kachmar

FOREIGN PATENT DOCUMENTS

KR 1020030052684 6/2003
KR 1020050120477 12/2005
KR 1020050121119 12/2005

OTHER PUBLICATIONS

Saghir Akhtar, Antisense Technology: Selection and Delivery of Optimally Acting Antisense Oligonucleotides, Journal of Drug Targeting, vol. 5, No. 4, pp. 225-234, 1998.
M. Ballico, et al., Triple, MPEG-Conjugated, Helix-Forming Oligonucleotides (TRIPEGXs): . . . , Bioconjugates Chem. 12, pp. 719-725, 2001.

* cited by examiner

*Primary Examiner* — Marisol Figueroa
(74) *Attorney, Agent, or Firm* — Roylance, Abrams, Berdo & Goodman L.L.P.

(57) ABSTRACT

A handoff apparatus and a method for reducing the number of session transfers in a mobile communication system are provided, in which an ANC determines whether a target ANT is included in an active set of the mobile communication system, establishes a connection session between the mobile communication system and an AT through a path connecting a target ANC of a different vendor and the target ANT if the target ANT is not included in the active set, and establishes the connection session between the mobile communication system and the AT through a path connecting the ANC and the target ANT if the target ANT is included in the active set.

11 Claims, 4 Drawing Sheets

APPARATUS AND METHOD FOR PERFORMING HANDOFF TO REDUCE NUMBER OF SESSION TRANSFERS IN A MOBILE COMMUNICATION SYSTEM

CROSS-REFERENCE TO RELATED PATENT APPLICATION

This application claims the benefit under 35 U.S.C. §119 (a) of Korean Patent Application No. 2006-0062646, filed on Jul. 4, 2006, in the Korean Intellectual Property Office, the entire disclosure of which is hereby incorporated by reference.

BACKGROUND OF THE INVENTION

1. Field of the Invention

The present invention relates to an apparatus and method for performing handoff to reduce the number of session transfers in a mobile communication system. More particularly, the present invention relates to an apparatus and method for reducing ping-pong-caused frequent session transfers between Access Networks (ANs), when an Access Terminal (AT) moves to a Code Division Multiple Access (CDMA) 2000 1xEvolution-Data Only (EV-DO) network of a different vendor, with a CDMA 2000 1xEV-DO packet session kept in a connected state.

2. Description of the Related Art

FIG. 1 illustrates a conventional session transfer method using two link layer paths.

Referring to FIG. 1, when an AT 130 needs a handoff from a source cell to a target cell of a different vendor, another wired/wireless link layer path is added for an activated RLP between a Packet Data Serving Node (PDSN) 110 and the AT 130 during a session transfer to the target cell.

During transferring the RLP to the new wired/wireless link layer path, a session control and traffic process should be naturally handed over to a Radio Network Controller (RNC) 117 of the target cell and an existing connection between an RNC 115 of the source cell and the PDSN 110 and an existing connection between the RNC 115 and the AT 130 should be released.

Since separate RLPs are provided to the RNCs 115 and 117 during the session transfer, the AT 130 can exchange user packets seamlessly on forward and reverse links.

Basically, the RNCs 115 and 117 of different vendors share a Radio Network Transceiver (RNT) 120 at a cell boundary and the two link layer paths are maintained. That is, the single RNT 120 supports communications from the PDSN 110 to the AT 130 through the two link layer paths for one RLP.

Due to the different link layer paths for the one RLP, header compression such as Robust Header Compression (ROHC) is carried out in the RNCs 115 and 117 to overcome the discrepancy between the link layer paths.

In the illustrated case of FIG. 1, a wired/wireless link layer path is added between the target RNC 117 and the RNT 120. The RNT 120 is shared between the source RNC 115 and the target RNC 117.

This is done to maintain an existing radio traffic setting. When a session is transferred, a wired setting is mainly changed, while the change of a wireless setting (i.e. the change of an active set) is minimal.

However, if handoff occurs frequently, that is ping-pong takes place between CDMA 2000 1xEV-DO networks of different vendors, the session is also transferred frequently between the source RNC 115 and the target RNC 117 at the boundary between the networks. As a result, call stability is impaired.

Also, when link layer paths are frequently set up for continual cross connectivity between the target RNC 117 and all RNTs included in the active set, load is added to the backhaul between the networks.

Although session information of the source RNC 115 and the old link layer path between the source RNC 115 and RNTs included in the active set can be maintained for some time during the session transfer for frequent handoff, resource consumption may result.

Accordingly, there is a need for an improved apparatus and method for performing handoff to reduce the number of session transfers in a mobile communication system.

SUMMARY OF THE INVENTION

Exemplary embodiments of the present invention address at least the above problems and/or disadvantages and provide at least the advantages described below. Accordingly, an aspect of exemplary embodiments of the present invention is to provide an apparatus and method for performing a handoff with a reduced number of session transfers in a mobile communication system.

Another aspect of exemplary embodiments of the present invention is to provide an apparatus and method for minimizing the number of ping-pong-caused session transfers when an AT moves to a mobile communication system of a different vendor, with a connection between the AT and an AN maintained.

A further aspect of exemplary embodiments of the present invention is to provide an apparatus and method for keeping Quality of Service (QoS) at the same level, while keeping one RLP link during a handoff between different vendors in mobile communication systems of the different vendors.

According to an aspect of exemplary embodiments of the present invention, there is provided a handoff method of an ANC for reducing the number of session transfers in a mobile communication system, in which the ANC determines whether a target ANT is included in an active set of the mobile communication system, establishes a connection session between the mobile communication system and an AT through a path connecting a target ANC of a different vendor and the target ANT, if the target ANT is not included in the active set, and establishes the connection session between the mobile communication system and the AT through a path connecting the ANC and the target ANT, if the target ANT is included in the active set.

According to another aspect of exemplary embodiments of the present invention, there is provided a handoff method of an ANC for reducing the number of session transfers in a mobile communication system, in which the ANC bans an AT from changing session information, when a session transfer to a target AN is determined, activates a session to the AT through the target AN by requesting a session allocation to a target ANC so that the target ANC performs a session setup procedure between a PDSN and a target ANT, and removes a session between the ANC and the PDSN.

According to a further aspect of exemplary embodiments of the present invention, there is provided a handoff apparatus of an ANC for reducing the number of session transfers during a handoff in a mobile communication system, in which when an AT performs a handoff, a session transfer processor establishes a connection session between the mobile communication system and the AT through a path connecting a target ANC of a different vendor and a target ANT if the target ANT is not included in an active set, the session transfer processor establishes the connection session between the mobile communication system and the AT through a path connecting the ANC and the target ANT if the target ANT is included in the active set, and a controller commands a session transfer to the session transfer processor.

According to still another aspect of exemplary embodiments of the present invention, there is provided a handoff apparatus of an ANC for reducing the number of session transfers during a handoff in a mobile communication system, in which when an AT performs a handoff, a session transfer processor bans the AT from changing session information, requests a session transfer to a target ANC of a different vendor so that the target ANC performs a session setup procedure between a PDSN and a target ANT, and removes a session between the ANC and the PDSN, and a controller commands the session transfer to the session transfer processor.

BRIEF DESCRIPTION OF THE DRAWINGS

The above and other objects, features and advantages of certain embodiments of the present invention will become more apparent from the following detailed description when taken in conjunction with the accompanying drawings, in which.

Throughout the drawings, the same drawing reference numerals will be understood to refer to the same elements, features, and structures.

DETAILED DESCRIPTION OF THE PREFERRED EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and method for performing a handoff so as to reduce the number of session transfers.

For this purpose, exemplary embodiments of the present invention support soft handoff between ANs of different vendors in CDMA 2000 1xEV-DO systems of the different vendors based on cross connectivity and enable a source Access Network Controller (ANC) to control a target AT of a different vendor directly or indirectly.

Unlike a conventional session transfer based on Make Before Break (MBB) and cross connectivity between ANs of different vendors, a session transfer takes place when sectors controlled by a target ANC disappear from an active set.

That is, exemplary embodiments of the present invention provide an apparatus and method for reducing ping-pong-caused frequent session transfers, which is a problem encountered with the conventional technology.

Also, exemplary embodiments of the present invention provide a method for providing a seamless handoff between different vendors using an existing RLP path, compared to the conventional technology in which two link layer paths are established for one RLP from a PDSN to an AT through source and target ANs.

In accordance with exemplary embodiments of the present invention, a session transfer occurs when an AT completely moves to a target AN. That is, a source ANC controls an on-going session until all the sectors of the source ANC are eliminated from the active set of the AT.

Herein, the term “AN” is used in the same sense as “Radio Network (RN)” and the term “ANC” is used in the same sense as “RNC”. The AN includes an ANC and an Access Network Transceiver (ANT) and the RN includes an RNC and an RNT.

Figure 1:
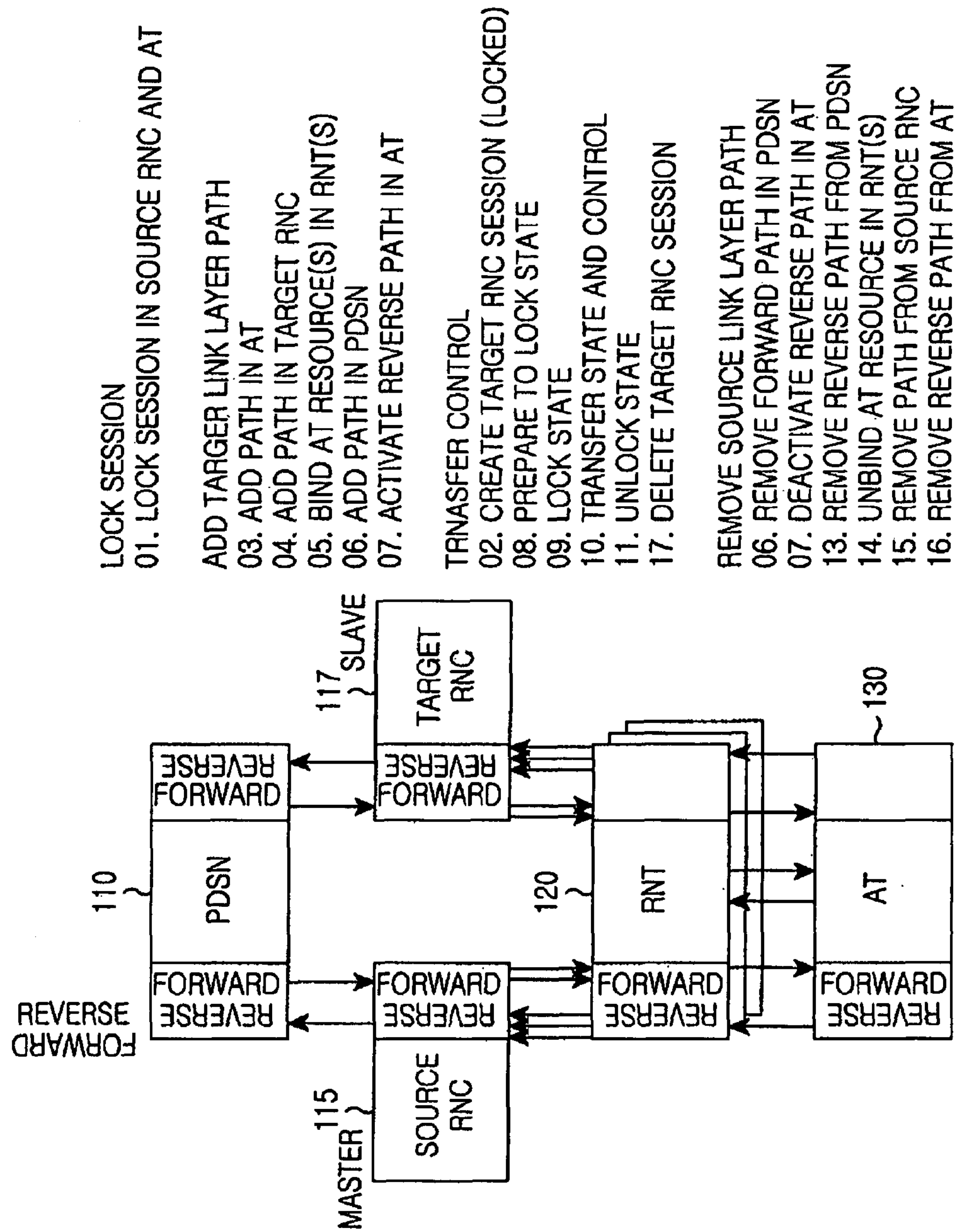
FIG. 1 illustrates a conventional session transfer method using two link layer paths.
Figure 2:
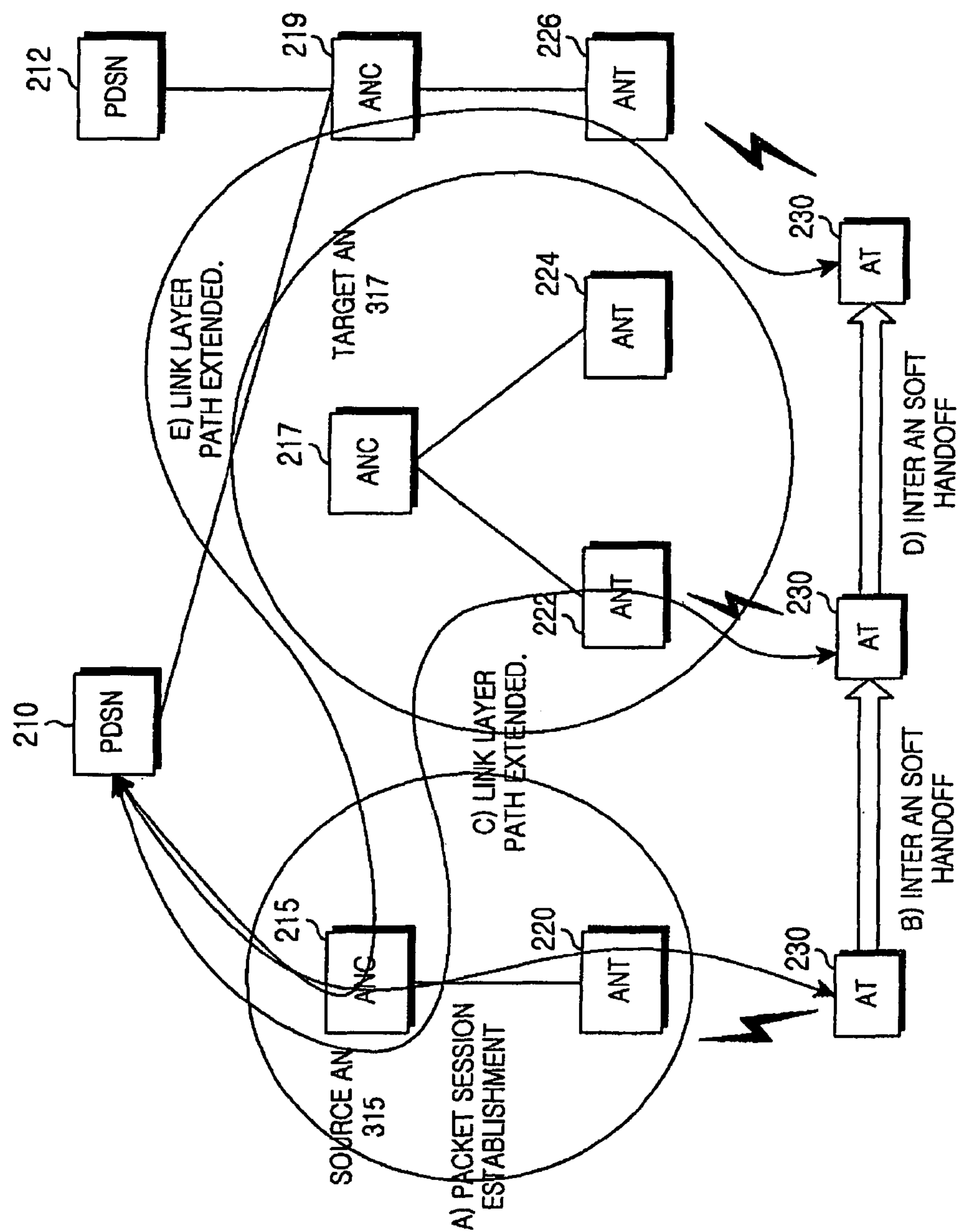
FIG. 2 illustrates a session transfer that takes place after an AT completely moves to a target AN according to an exemplary embodiment of the present invention.

FIG. 2 illustrates a session transfer that takes place after an AT completely moves to a target AN according to an embodiment of the present invention.

Referring to FIG. 2, even though an AT 230 moves to a service area of a different vendor, a source ANC 215 is kept connected to ANTs 220, 222, 224 and 226 of service areas through which the AT 230 moves until a session transfer occurs.

When it is determined that the AT 230 is completely out of the service area of the source ANC 215, the session transfer takes place.

Since the session transfer is carried out after the AT 230 completely moves into a target AN, without a connection setup based on cross connectivity between the target AN and a source ANT that provides an existing traffic channel, exemplary embodiments of the present invention can reduce frequent session transfers caused by ping-pong.

When the AT 230 moves to the service area of a system of a different vendor in a connected state, service continuity can be ensured by cross connectivity-based soft handoff.

However, an increase in the load of a backhaul network due to relaying of user packets between different vendors and a transmission delay decrease QoS, which can be a problem to users and operators.

Therefore, it is necessary to transfer a session when the AT 230 has moved to the target AN. That is, the AT 230 performs soft handoff and then moves to the target AN in steps b) and d). Then, in steps c) and d), the AT 230 updates a link layer path. In this case, PDSNs 210 and 212 can be shared by different vendors.

The session transfer is carried out only when the AT 230 moves to a sector which is not included in an active set.

Now a description will be made of a technique for supporting a seamless handoff through a single wired/wireless link layer path according to an exemplary embodiment of the present invention.

In the conventional two routes per RLP technology, an additional wired/wireless link layer path is established from a PDSN to an AT. Therefore, only Signaling Layer Protocol (SLP) information processed in a source AN has to be transmitted to a target AN during a session transfer.

In contrast, exemplary embodiments of the present invention still use an existing RLP path.

Figure 3:
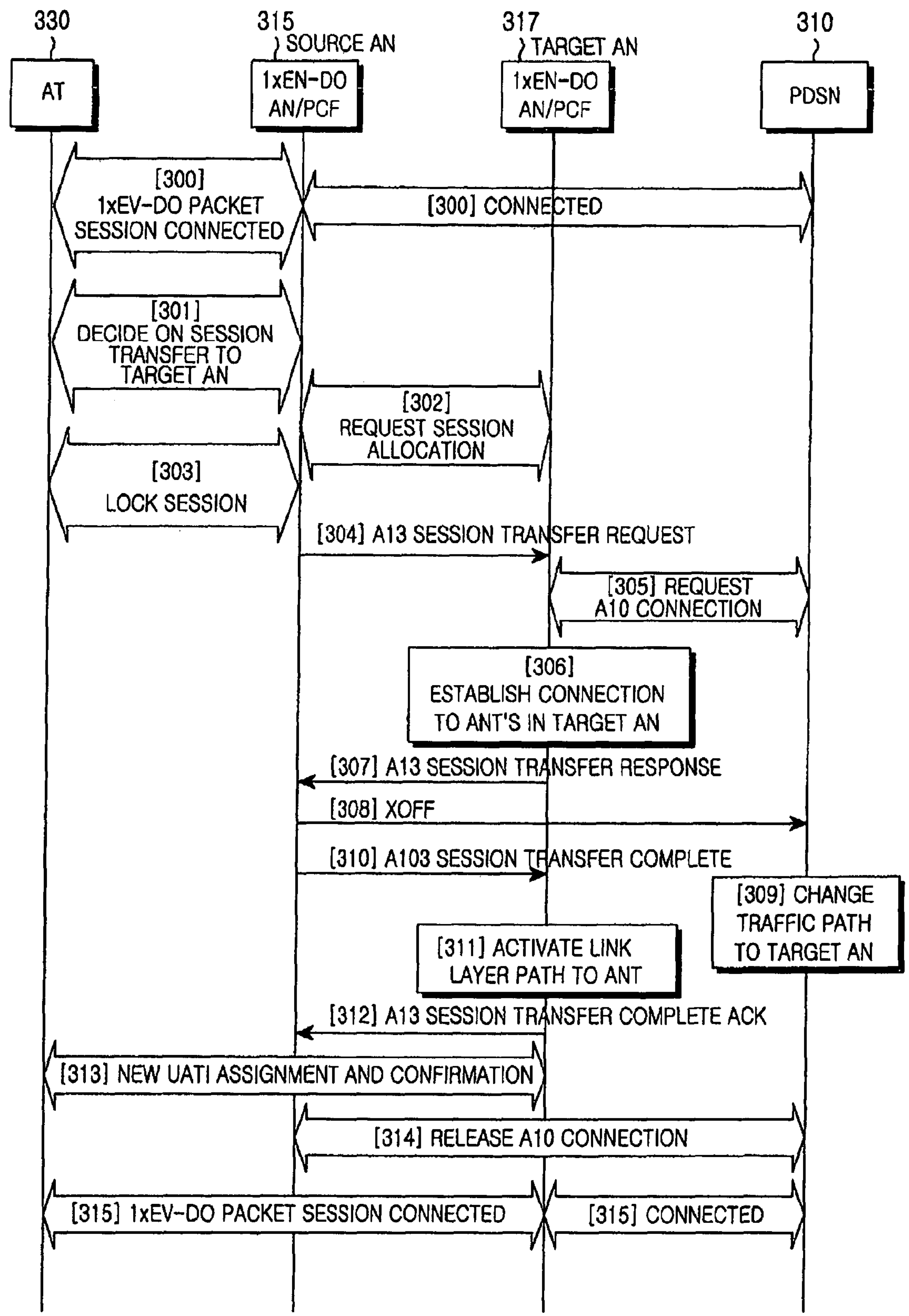
FIG. 3 is a diagram illustrating a signal flow for a session transfer using an existing RLP path according to an exemplary embodiment of the present invention.

FIG. 3 is a diagram illustrating a signal flow for a session transfer using an existing RLP path according to an exemplary embodiment of the present invention.

Referring to FIG. 3, an AT 330 is receiving a service through a source AN 315 in step 300. When the AT 330 moves to a target AN 317, it performs a soft handoff from a source ANT to a target ANT by cross connectivity.

If the AT 330 determines that a session transfer is required due to the movement to the target AN 317 in step 301, a session allocation procedure is performed in step 302.

If the session transfer to the target AN 317 is possible, the source AN 315 locks a session so as to prevent the AT 330 from changing session information in step 303 and requests the session transfer to the target AN 317 by an A13 Session Transfer Request message in step 304.

In this case, information about ANTs connected by cross connectivity is also transmitted. Then, the target AN 317 requests an A10 connection to a PDSN 310 in step 305 and establishes a wired/wireless link layer path to ANTs in step 306.

When the establishment is successful, the target AN 317 transmits an A13 Session Transfer Response message to the source AN 315, notifying the session transfer success in step 307.

In step 308, the source AN 315 transmits XOFF to the PDSN 310. The PDSN 310 changes a current A10 connection to the target AN 317 in step 309. Then traffic transmission/reception starts between the PDSN 310 and the target AN 317.

In step 310, the source AN 315 provides SLP information and final processed RLP information (e.g. sequence information) to the target AN 317 by an A13 Session Transfer Complete message, thus completing the session transfer.

The target AN 317 activates the link layer path of an ANT, thus connecting a wireless path between the AT 330 and the ANT to a wired path between the target AN 317 to the PDSN 310 in step 311.

In step 312, the target AN 317 replies to the source AN 315 with an A13 Session Transfer Complete Ack message. The source AN 315 forwards user packets received from the PDSN 310 temporarily after step 308 to the target AN 317.

The target AN 317 starts a signaling control and traffic processing operation based on the SLP and RLP information received from the source AN 315.

The target AN 317 allocates a new Unicast Access Terminal Identifier (UATI) to the AT 330 in step 313. Almost at the same time, the PDSN 310 transmits an A11 Registration Update message to the source AN 315, releasing the A10 connection, when the A10 connection is not required in step 314. Then the session transfer is completed and the session is managed by the target AN 317 in step 315.

The source AN 315 transmits to the target AN 117 additional processing information about traffic to which header compression like ROHC is applied to in step 304.

During the session transfer, the source AN 315 forwards user packets received from the PDSN 310 to the target AN 317 for a predetermined time period. Therefore, packet loss that may occur during the session transfer from the source AN 315 to the target AN 317 is minimized.

The above-described session transfer mechanism in FIG. 2 of an exemplary embodiment of the present invention is suitable for an application service to which transmission itself is important, such as File Transfer Protocol (FTP), in that a session transfer takes place only after an AT completely moves to a target AN, that is, a source ANC keeps its control as long as possible.

The session transfer mechanism in FIG. 3 of an exemplary embodiment of the present invention also ensures sufficient QoS for an application service that tolerates partial packet loss and out-of-order delivery, such as Voice over Internet Protocol (VoIP), in that a single link layer path is used.

Figure 4:
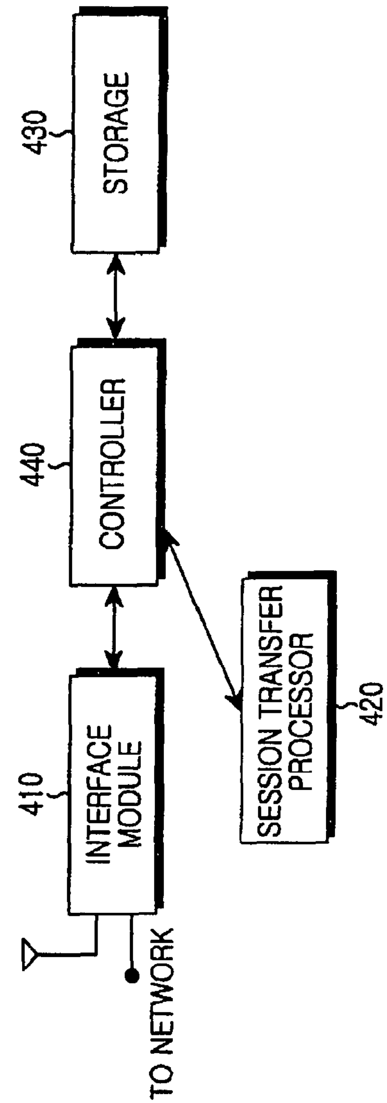
FIG. 4 is a block diagram of an AN apparatus for reducing the number of session transfers according to an exemplary embodiment of the present invention.

FIG. 4 is a block diagram of an AN apparatus for reducing the number of session transfers according to an embodiment of the present invention.

Referring to FIG. 4, a controller 440 provides overall control to the AN apparatus. For example, the controller 440 processes and controls voice communication and data communication. In addition to its typical functionalities, the controller 440 performs a handoff between different vendors. If a session transfer is required during the handoff, the controller 440 controls a session transfer processor 420 to decide on a session transfer scheme and performs the session transfer in the session transfer scheme according to an exemplary embodiment of the present invention.

Depending on whether the decided session transfer scheme is to perform the session transfer by changing a session transfer time or to support a seamless handoff via a single link layer path and perform the session transfer correspondingly, the controller 440 performs the session transfer accordingly.

The session transfer processor 420 decides on the session transfer scheme under the control of the controller 440 and notifies the controller 440 of the decided session transfer scheme.

For example, for an application service whose transmission itself is significant, such as FTP, the session transfer processor 420 decides on a session transfer scheme that changes a session transfer time to after an AT completely moves to a new AN. For an application service that tolerates partial packet loss and out-of-order delivery, such as VoIP, the session transfer processor 420 can decide on a session transfer scheme that uses a single link layer path. This decision method is not fixed and thus other methods are also available. Also, only one of the two session transfer schemes can be used.

A storage 430 stores programs for controlling the AN apparatus and temporarily stores data generated during program execution.

An interface module 410 is used to communicate with a higher-layer network or an AT. For communicating with the AT, the interface module 410 includes a Radio Frequency (RF) processor and a baseband processor.

The RF processor downconverts an RF signal received through an antenna to a baseband signal and provides the baseband signal to the baseband processor. It also upconverts a baseband signal received from the baseband processor to an RF signal transmittable in the air and transmits the RF signal through the antenna.

In CDMA, for example, the baseband processor channel-encodes and spreads transmission data during transmission. It despreads and channel-decodes a received signal during reception.

For communicating with the higher-layer network, the interface module 410 includes a baseband processor and a wired processor. Many technologies including optical communications can be applied to a physical transmission interface used by the wired processor.

The controller 440 controls the session transfer processor 420. That is, the controller 440 can perform the functions of the session transfer processor 420. While the controller 440 and the session transfer processor 420 are shown separately for illustrative purposes, the session transfer processor 420 can be wholly or partially incorporated into the controller 440 in real implementation. Also, separate means can be configured for performing individual operation steps or these means can be incorporated into the controller 440.

As described above, exemplary embodiments of the present invention advantageously minimize the number of ping-pong-caused frequent session transfers by changing a session transfer time to after an AT moves to a target AN.

Without a connection setup between the target AN and a source AN in the conventional cross connectivity structure, exemplary embodiments of the present invention reduce unnecessary traffic transmission/reception on the backhaul between different vendors.

Further, exemplary embodiments of the present invention provide a seamless handoff between different vendors, while keeping a single wired/wireless link layer path in a connected state. Therefore, exemplary embodiments of the present invention can be easily implemented.

The present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While certain exemplary embodiments of the invention have been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A handoff method for reducing the number of session transfers in a mobile communication system, comprising the steps of:

determining whether a target Access Network Transceiver (ANT) of a different vendor is included in an active set of the mobile communication system;

if the target ANT of the different vendor is not included in the active set, establishing a connection session between a Packet Data Serving Node (PDSN) and an Access Terminal (AT) through a path connecting a source Access Network Controller (ANC) and a target ANC of the different vendor and a path connecting the target ANC of the different vendor and the target ANT of the different vendor; and if the target ANT is included in the active set, establishing the connection session between the PDSN and the AT through a path connecting the source ANC and the target ANT of the different vendor.

2. The handoff method of claim 1, wherein the source ANC and the target ANC of the different vendor share the PDSN.

3. A handoff apparatus of a source Access Network Controller (ANC) for reducing the number of session transfers during a handoff in a mobile communication system, comprising:

a session transfer processor for determining whether a target Access Network Transceiver (ANT) of a different vendor is included in an active set of the mobile communication system, if the target ANT of the different vendor is not included in the active set, sending a request to establish a connection session between a Packet Data Serving Node (PDSN) and an Access Terminal (AT) through a path connecting the source ANC and a target ANC of the different vendor and a path connecting the target ANC of the different vendor and the target ANT of the different vendor and establishing a path connecting the source ANC and the target ANC, if the target ANT is included in the active set, establishing the connection session between the PDSN and the AT through a path connecting the source ANC and the target ANT of the different vendor;

a controller for commanding a session transfer to the session transfer processor.

4. The handoff apparatus of claim 3, wherein the source ANC and the target ANC of the different vendor share the PDSN.

5. The handoff apparatus of claim 3, wherein the session transfer processor supports the handoff seamlessly by maintaining an old path during the handoff.

6. A handoff method of a source Access Network Controller (ANC) for reducing the number of session transfers during a handoff in a mobile communication system, comprising:

determining whether a target Access Network Transceiver (ANT) of a different vendor is included in an active set of the mobile communication system;

if the target ANT is not included in the active set, sending a request to a target ANC of the different vendor for establishing a connection session between a Packet Data Serving Node (PDSN) and an Access Terminal (AT) through a path connecting the source ANC and the target ANC of the different vendor and a path connecting the target ANC of the different vendor and the target ANT of the different vendor;

establishing a path connecting the source ANC and the target ANC; and if the target ANT is included in the active set, establishing the connection session between the PDSN and the AT through a path connecting a source ANC and the target ANT of the different vendor.

7. The handoff method of claim 6, wherein the source ANC and the target ANC of the different vendor share the PDSN.

8. A handoff system for reducing the number of session transfers in a mobile communication system, comprising:

a source Access Network Controller (ANC) for determining whether a target Access Network Transceiver (ANT) of a different vendor is included in an active set of the mobile communication system, if the target ANT of the different vendor is not included in the active set, sending a request to a target ANC of the different vendor for establishing a connection session between a Packet Data Serving Node (PDSN) and an Access Terminal (AT) through a path connecting the source ANC and the target ANC of the different vendor and a path connecting the target ANC of the different vendor and the target ANT of the different vendor and establishing a path connecting the source ANC and the target ANC, if the target ANT is included in the active set, establishing the connection session between the PDSN and the AT through a path connecting the source ANC and the target ANT of the different vendor; and the target ANC for determining whether to receive the request from the source ANC, if the target ANC receive the request, establishing a connection session between the PDSN and the AT through a path connecting the target ANC of the different vendor and the target Access Network Transceiver (ANT) of the different vendor.

9. The handoff system of claim 8, wherein the source ANC and the target ANC of the different vendor share the PDSN.

10. A handoff apparatus of a source Access Network Controller (ANC) for reducing the number of session transfers during a handoff in a mobile communication system, comprising:

means for determining whether a target Access Network Transceiver (ANT) of a different vendor is included in an active set of the mobile communication system;

means for sending a request to a target ANC of the different vendor for establishing a connection session between a Packet Data Serving Node (PDSN) and an Access Terminal (AT) through a path connecting the source ANC and a target ANC of the different vendor and a path connecting the target ANC of the different vendor and the target ANT of the different vendor if the target ANT is not included in the active set;

means for establishing a path connecting the source ANC and the target ANC if the target ANT is not included in the active set; and means for establishing the connection session between the PDSN and the AT through a path connecting the source ANC and the target ANT of the different vendor, if the target ANT is included in the active set.

11. The handoff apparatus of claim 10, wherein the source ANC and the target ANC of the different vendor share the PDSN.

* * * * *